(12) United States Patent
Aravamudan et al.

(10) Patent No.: US 11,366,820 B2
(45) Date of Patent: *Jun. 21, 2022

(54) USER INTERFACE METHODS AND SYSTEMS FOR SELECTING AND PRESENTING CONTENT

(71) Applicant: VEVEO, INC., Andover, MA (US)

(72) Inventors: Murali Aravamudan, Andover, MA (US); Kajamalai G. Ramakrishnan, Nashua, NH (US); Rakesh Barve, Bangalore (IN); Sashikumar Venkataraman, Andover, MA (US); Ajit Rajasekharan, West Windsor, NJ (US)

(73) Assignee: VEVEO, INC., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,610

(22) Filed: Dec. 29, 2021

(65) Prior Publication Data

US 2022/0129472 A1     Apr. 28, 2022

Related U.S. Application Data

(63) Continuation of application No. 17/153,476, filed on Jan. 20, 2021, which is a continuation of application
(Continued)

(51) Int. Cl.
*G06F 16/30* (2019.01)
*G06F 16/2457* (2019.01)
(Continued)

(52) U.S. Cl.
CPC ...... *G06F 16/24578* (2019.01); *G06F 3/0481* (2013.01); *G06F 3/0482* (2013.01);
(Continued)

(58) Field of Classification Search
CPC .......... G06F 16/24578; G06F 16/9535; G06F 16/335; G06F 16/951
(Continued)

(56) References Cited

U.S. PATENT DOCUMENTS 6,307,548 B1    10/2001   Flinchem et al.
6,571,234 B1    5/2003    Knight et al.
(Continued)

*Primary Examiner* — Sana A Al-Hashemi
(74) *Attorney, Agent, or Firm* — Haley Guiliano LLP

(57) ABSTRACT

A user-interface method of selecting and presenting a collection of content items based on user navigation and selection actions associated with the content is provided. The method includes associating a relevance weight on a per user basis with content items to indicate a relative measure of likelihood that the user desires the content item. The method includes receiving a user's navigation and selections actions for identifying desired content items, and in response, adjusting the associated relevance weight of the selected content item and group of content items containing the selected item. The method includes, in response to subsequent user input, selecting and presenting a subset of content items and content groups to the user ordered by the adjusted associated relevance weights assigned to the content items and content groups.

28 Claims, 11 Drawing Sheets

Related U.S. Application Data

No. 16/174,073, filed on Oct. 29, 2018, now Pat. No. 10,929,410, which is a continuation of application No. 14/793,074, filed on Jul. 7, 2015, now Pat. No. 10,146,840, which is a continuation of application No. 14/175,189, filed on Feb. 7, 2014, now Pat. No. 9,087,109, which is a continuation of application No. 13/765,335, filed on Feb. 12, 2013, now Pat. No. 8,688,746, which is a continuation of application No. 13/479,820, filed on May 24, 2012, now Pat. No. 8,423,583, which is a continuation of application No. 13/336,660, filed on Dec. 23, 2011, now Pat. No. 8,375,069, which is a continuation of application No. 13/034,034, filed on Feb. 24, 2011, now Pat. No. 8,086,602, which is a continuation of application No. 12/326,485, filed on Dec. 2, 2008, now Pat. No. 7,899,806, which is a continuation of application No. 11/738,101, filed on Apr. 20, 2007, now Pat. No. 7,461,061.

(60) Provisional application No. 60/793,540, filed on Apr. 20, 2006, provisional application No. 60/793,537, filed on Apr. 20, 2006.

(51) Int. Cl.
| | | |
|---|---|---|
| *G06F 3/04842* | (2022.01) | |
| *G06F 3/0482* | (2013.01) | |
| *G06F 16/248* | (2019.01) | |
| *G06F 16/335* | (2019.01) | |
| *G06F 16/951* | (2019.01) | |
| *G06F 16/9535* | (2019.01) | |
| *G06F 3/0481* | (2022.01) | |

(52) U.S. Cl.
CPC ........ *G06F 3/04842* (2013.01); *G06F 16/248* (2019.01); *G06F 16/335* (2019.01); *G06F 16/951* (2019.01); *G06F 16/9535* (2019.01); *Y10S 707/99933* (2013.01); *Y10S 707/99934* (2013.01); *Y10S 707/99935* (2013.01); *Y10S 707/99942* (2013.01); *Y10S 707/99943* (2013.01)

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 6,801,909 B2* | 10/2004 | Delgado | G06Q 30/02 707/999.005 |
| 6,804,675 B1 | 10/2004 | Knight et al. | |
| 7,117,207 B1* | 10/2006 | Kerschberg | G06F 16/337 707/999.005 |
| 8,527,510 B2* | 9/2013 | Chen | G06Q 10/10 707/736 |
| 2003/0033295 A1 | 2/2003 | Adler et al. | |
| 2006/0015588 A1* | 1/2006 | Achlioptas | G06Q 10/107 709/220 |
| 2006/0285665 A1* | 12/2006 | Wasserblat | G06Q 20/4016 704/E17.002 |
| 2008/0177994 A1 | 7/2008 | Mayer | |
| 2008/0215623 A1* | 9/2008 | Ramer | G06Q 30/08 |

* cited by examiner

USER INTERFACE METHODS AND SYSTEMS FOR SELECTING AND PRESENTING CONTENT

CROSS-REFERENCE TO RELATED APPLICATIONS

This application is a continuation of prior U.S. patent application Ser. No. 16/174,073, filed Oct. 29, 2018, which is a continuation of U.S. patent application Ser. No. 14/793,074, filed Jul. 7, 2015, now U.S. Pat. No. 10,146,840, which is a continuation of prior U.S. patent application Ser. No. 14/175,189, filed on Feb. 7, 2014, now U.S. Pat. No. 9,087,109, which is a continuation of prior U.S. patent application Ser. No. 13/765,335, filed on Feb. 12, 2013, now U.S. Pat. No. 8,688,746, which is a continuation of prior U.S. patent application Ser. No. 13/479,820, filed on May 24, 2012, now U.S. Pat. No. 8,423,583, which is a continuation of prior U.S. patent application Ser. No. 13/336,660, filed on Dec. 23, 2011, now U.S. Pat. No. 8,375,069, which is a continuation of U.S. patent application Ser. No. 13/034,034, filed on Feb. 24, 2011, now U.S. Pat. No. 8,086,602, which is a continuation of prior U.S. patent application Ser. No. 12/326,485 filed on Dec. 2, 2008, now U.S. Pat. No. 7,899,806, which is a continuation of U.S. patent application Ser. No. 11/738,101 filed on Apr. 20, 2007, now U.S. Pat. No. 7,461,061, which claims the benefit under 35 U.S.C. § 119(e) of U.S. Provisional Application No. 60/793,537, filed Apr. 20, 2006, and U.S. Provisional Application No. 60/793,540, filed Apr. 20, 2006, the contents of all of which are incorporated by reference herein.

This application is related to U.S. patent application Ser. No. 11/738,138, entitled User Interface Methods and Systems For Selecting and Presenting Content Based On Relationships Between the User and Other Members of An Organization, filed Apr. 20, 2007, now U.S. Pat. No. 7,539,676.

BACKGROUND

Field of Invention

This invention generally relates to learning the behavior of a user navigating and selecting content on input and display constrained devices. More specifically, the invention relates to using the learned navigation and selection behavior data to personalize the user's interactions with various service providers and content query systems, e.g., to better find results to queries provided by the user and to order the results for presentation to the user.

Description of Related Art

The acid test for the usability of an information finding system on input constrained and display constrained devices is the effort expended by the user in the discovery of desired information (the discovery of information could be text based search, browsing a content space, or some combination of both). The effort expended by the user is the number of steps involved in interacting with an information finding system to discover the desired information. Each click of a button, or a scroll motion, or the entry of a character, would be perceived by the user as expended effort. The success of any user interface may be determined by this metric.

Minimizing the effort expended to find information (be it search or browse) is a challenging problem on input and display constrained devices such as mobile phones and televisions. The method of discovery the user chooses may vary upon the application context and the user intent—for example, a user may, from past habit, browse through the phonebook to a contact to make a call (especially when the contact list is small), or perform text input when searching for a web site. Browse based navigation is typically used (and is effective) when the user's intent is broad. Furthermore it is a viable form of navigation only when the content space is not very large at any level of navigation of the content space hierarchy—only text-based search is effective for content spaces that are large. Any solution however, needs to solve the "minimal effort" problem for both these forms of discovery.

BRIEF SUMMARY

The invention provides methods and systems for selecting and presenting content based on learned user navigation and selection actions associated with the content.

Under another aspect of the invention, a user-interface method of selecting and presenting a collection of content items in which the presentation s ordered at least in part based on navigation and selection behavior of a user learned over time includes providing a set of content items where each content item has an associated relevance weight on a per user basis. The method also includes organizing the content items into groups based on the informational content of the content items, each group of content items having an associated relevance weight on a per user basis. The method further includes receiving from the user navigation and selection actions, adjusting the associated relevance weight of the selected content item. The method also includes, in response to subsequent input entered by the user, selecting and presenting a subset of content items and content groups to the user where the content items and content groups are ordered at least in part by the adjusted associated relevance weights assigned to the content items and content groups such that content items with greater associated relevance weights are presented as more relevant content items within a content group and groups of content items with greater associated relevance weights are presented as more relevant groups of content items.

Under further aspect of the invention, the context such as geographic location of the user, day, date, and time, in which the user performed the selection action is associated with the adjusted relevance weighting of content items and groups of content items. The adjusted relevance weighting of content items and groups of content items is only used in subsequent searches by the user when the search is performed in the same or similar context.

Under yet another aspect of the invention, the adjusted associated relevance weights are decayed as time passes from the act of adjusting the associated relevance weights.

Under yet another aspect of the invention, the adjusted associated relevance weights are decayed based upon the number of user selections occurring after the act of adjusting the associated relevance weights.

These and other features will become readily apparent from the following detailed description where embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
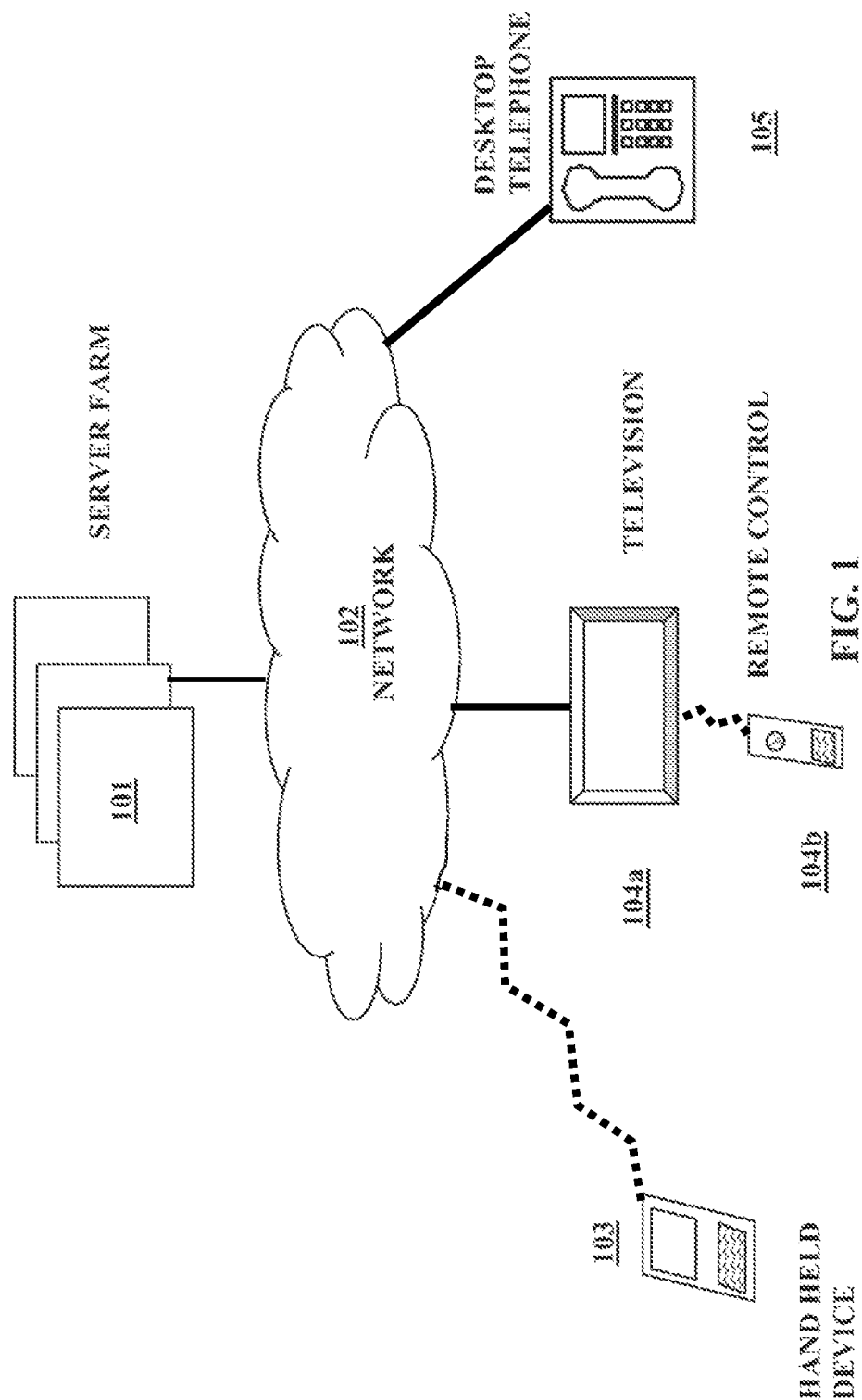
FIG. 1 illustrates a network based information navigation system in accordance with one or more embodiments of the invention.

The invention addresses the shortcomings of existing information navigation systems by taking a unified approach to the information finding process, be it search (incremental or full word search) or browse, and helps the user find information of interest by personalizing the information space to match the user's actions and exploiting the relationship of the user to the information space being navigated. A multi-pronged holistic approach of taking into account (1) what the user does with the device (user's intent) (2) when do these interactions happen (3) and where do these interactions happen, provides significant insights into achieving the goal of reducing device interactions, and thereby improving the user experience.

For text-input based discovery content, the key factors to reduce the effort involved in discovering information is to reduce the number of characters the user has to type in to discover the desired information and the number of browse navigations to reach the desired result once it appears on the screen. Incremental text search, combined with the right relevance ordering of results, is key to reducing the effort involved in discovering content through text-input based search. For browse based discovery of content, minimizing the number of navigations (navigating through folders and linear scroll) through the browse hierarchy is key.

Preferred embodiments of the invention capture user preferences, user information navigation behavior, and a user's relationship to an information hierarchy. The learned data is used to personalize the user's interaction with various service providers and the user's interaction with content query systems, e.g., to personalize the navigation and discovery of information by the user. In an illustrative embodiment, the user is searching a phonebook for an individual phone number. In another illustrative embodiment, the user is an employee searching a corporate hierarchy for superiors, peers, and subordinates.

Embodiments of the present invention build on techniques, systems and methods disclosed in earlier filed applications, including but not limited to U.S. patent application Ser. No. 11/136,261, entitled Method and System For Performing Searches For Television Programming Using Reduced Text Input, filed on May 24, 2005; U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005; U.S. patent application Ser. No. 11/235,928, entitled Method and System For Processing Ambiguous, Multiterm Search Queries, filed on Sep. 27, 2005; U.S. patent application Ser. No. 14/509,909, entitled User Interface For Visual Cooperation Between Text Input And Display Device, filed Aug. 25, 2006; and U.S. patent application Ser. No. 11/682,693, entitled Methods and Systems For Selecting and Presenting Content Based On Learned Periodicity Of User Content Selection, filed on Mar. 6, 2007; the contents of each of which are herein incorporated by reference. Those applications taught specific ways to perform incremental searches using ambiguous text input, methods of ordering the search results, and techniques for learning a user's behavior and preferences. The techniques disclosed in those applications can be used with the user's navigation behavior or the user's relationship to an information hierarchy described herein in the same or similar ways in which the techniques are applied to the collections of content items described in those applications. In such a case, the user's behavior or relationship described herein represents a particular type of content item. The present techniques, however, are not limited to systems and methods disclosed in the incorporated patent applications. Thus, while reference to such systems and applications may be helpful, it is not believed necessary to understand the present embodiments or inventions.

Referring to FIG. 1, an overall system for navigation of local and/or network resident information using a wide range of devices in accordance with one or more embodiments of the invention is illustrated. A server farm 101 serves as the source of navigation data and relevance updates with a network 102 functioning as the distribution framework. The distribution could be a combination of wired and wireless connections. The navigation devices could have a wide range of interface capabilities such as a hand-held device 103 (e.g. phone, PDA, or a music/video playback device) with limited display size and optionally an overloaded or small QWERTY keypad, a television 104a coupled with a remote 104b having an overloaded or small QWERTY keypad, or a desktop telephone 105 with limited display and input entry capabilities.

Figure 2:
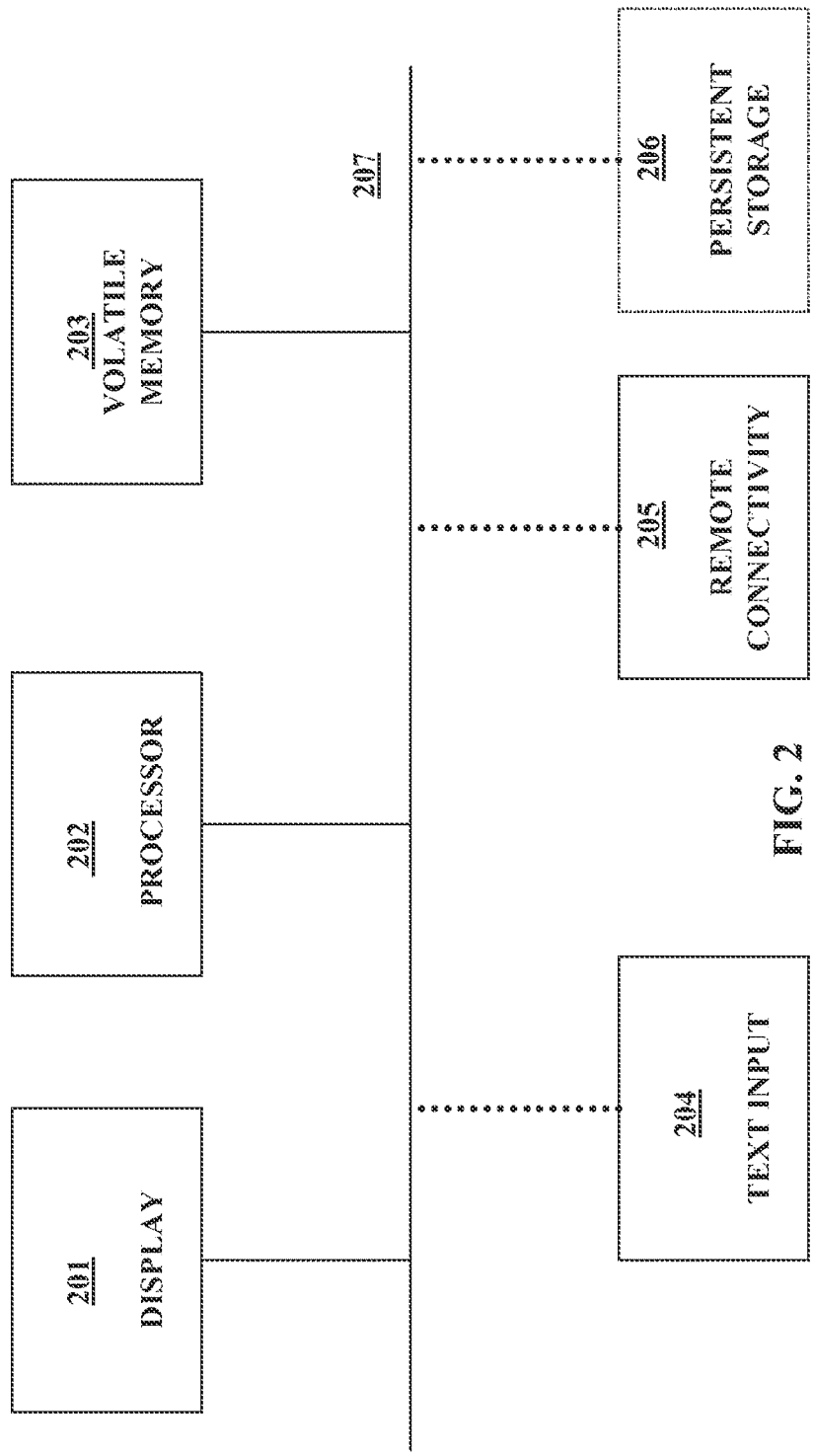
FIG. 2 illustrates device configuration options to perform navigation of locally or remotely resident information.

Referring to FIG. 2, multiple device configurations for search are illustrated. In one configuration, a navigation device 103 has a display 201, a processor 202, a volatile memory 203, a text input interface 204 which is on-device, remote connectivity 205 to a server 101 through a network 102, and a local persistent storage 206. In another device configuration the device 103 may not have the local persistent storage 206. In such a scenario, the device 103 would have remote connectivity 205 to submit the query to the server 101 and retrieve results from it. In another configuration of the device 103, it may not have remote connectivity 205. In this scenario the navigation database may be locally resident on the local persistent storage 206. The persistent storage 206 may be a removable storage element, such as SD, SmartMedia, CompactFlash card etc. In a configuration of the device with remote connectivity 205 and the local persistent storage 206 for navigation, the device may use the remote connectivity for search/browse relevance data update or for the case where the navigation database is distributed on the local storage 206 and on the server 101.

Figure 3A:
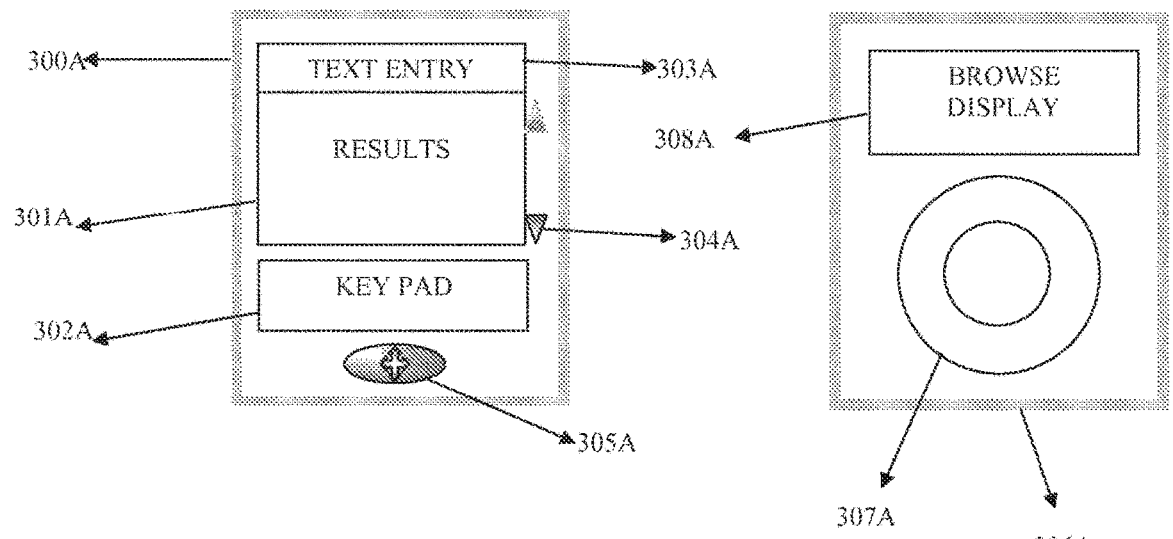
FIG. 3A illustrates instances of mobile device interface used to perform navigation of locally or remotely resident information.

FIG. 3A illustrates a mobile device 300A interface for navigating locally or remotely resident information. The user enters text using a keypad 302A and the entered text is displayed in a text field 303A. The navigation interface on the device is a navigation button 305A that facilitates movement minimally in horizontal and vertical directions. The results are displayed in a results area 301A corresponding to the input incremental text query or browse action. The user can scroll through the results using a scroll interface 304A using the navigation buttons 305A. An alternate scroll interface 307A is shown in a browse only device 306A (e.g. a music player like iPod where content is remotely resident and the user remotely navigates this content). The browse results are shown in the display 308A.

Figure 3B:
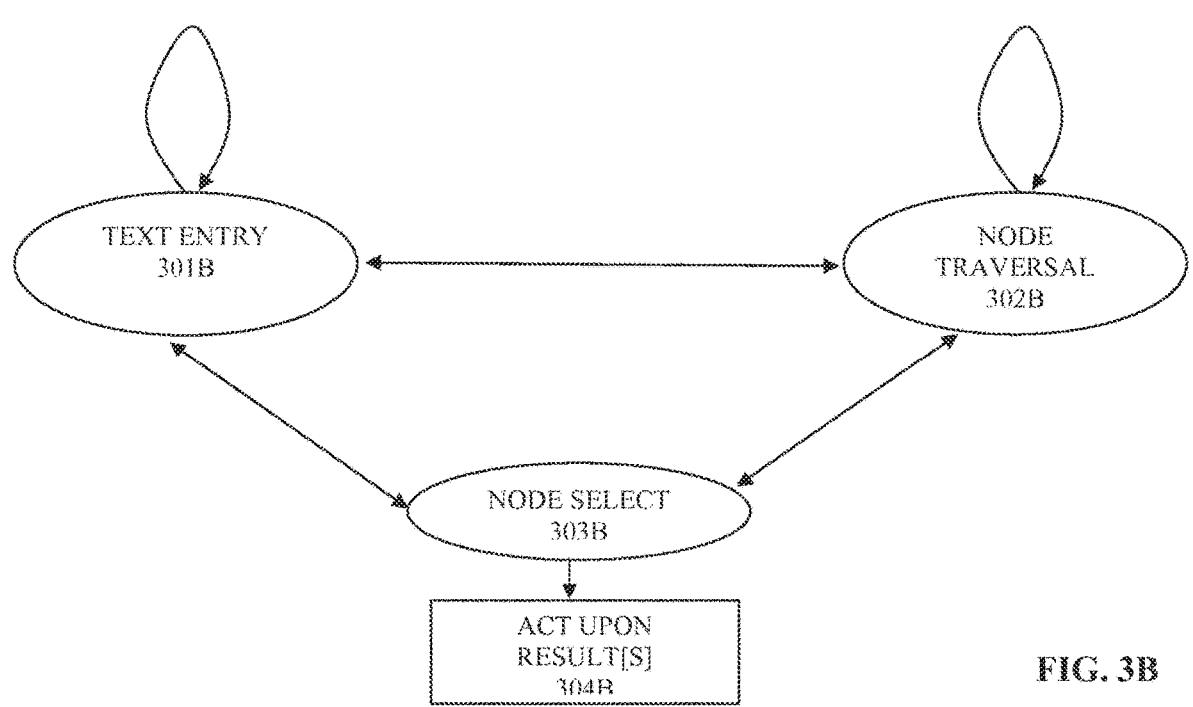
FIG. 3B illustrates the various states the user can transition through to arrive at the desired result through navigation of resident information.

FIG. 3B illustrates the various states of navigation actions a user could transition in order to get to the desired result. The user has the freedom to choose, either exclusively or a combination of, text entry and browse forms of discovery of the result(s) of interest. The actual path taken however may be influenced by both the user's intent and the information that is displayed. For instance, the user may start by entering text 301B, and may scroll through the displayed results 302B, pick a non-terminal node 303B and traverse the children of the non-terminal 302B. When the user discovers a result, he selects it 303B and performs an appropriate action 304B. This is discussed in further detail in FIG. 5 and FIG. 6.

Figure 3C:
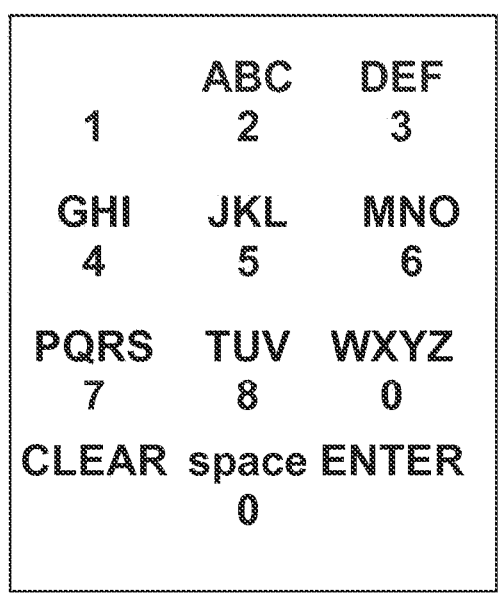
FIG. 3C illustrates a 12-key keypad with overloaded keys.

FIG. 3C illustrates a 12-key keypad with overloaded keys. As explained in greater detail in the incorporated earlier filed applications a keypad with overloaded keys may be used to perform text input for incremental searches.

Personalized Navigation Based on the User's Navigation Behavior

FIGS. 4A-4D graphically illustrate one embodiment of personalized navigation with the data hierarchy changing over time as a node is repetitively acted upon. As described in more detail below, and based on techniques described in one or more of the incorporated applications, the relevance weight for a particular node is influenced by the context of each repetitive action taken upon the node, including the time and location of the action. Therefore, the first discoverable node in the phonebook list can be based on both a user's past navigation behavior along with the current search location and time. For example U.S. patent application Ser. No. 11/682,693, entitled Methods and Systems For Selecting and Presenting Content Based On Learned Periodicity Of User Content Selection, filed on Mar. 6, 2007, describes techniques used to infer future behavior of the user from past behavior.

Figures 4A, 4B, 4C, 4D:
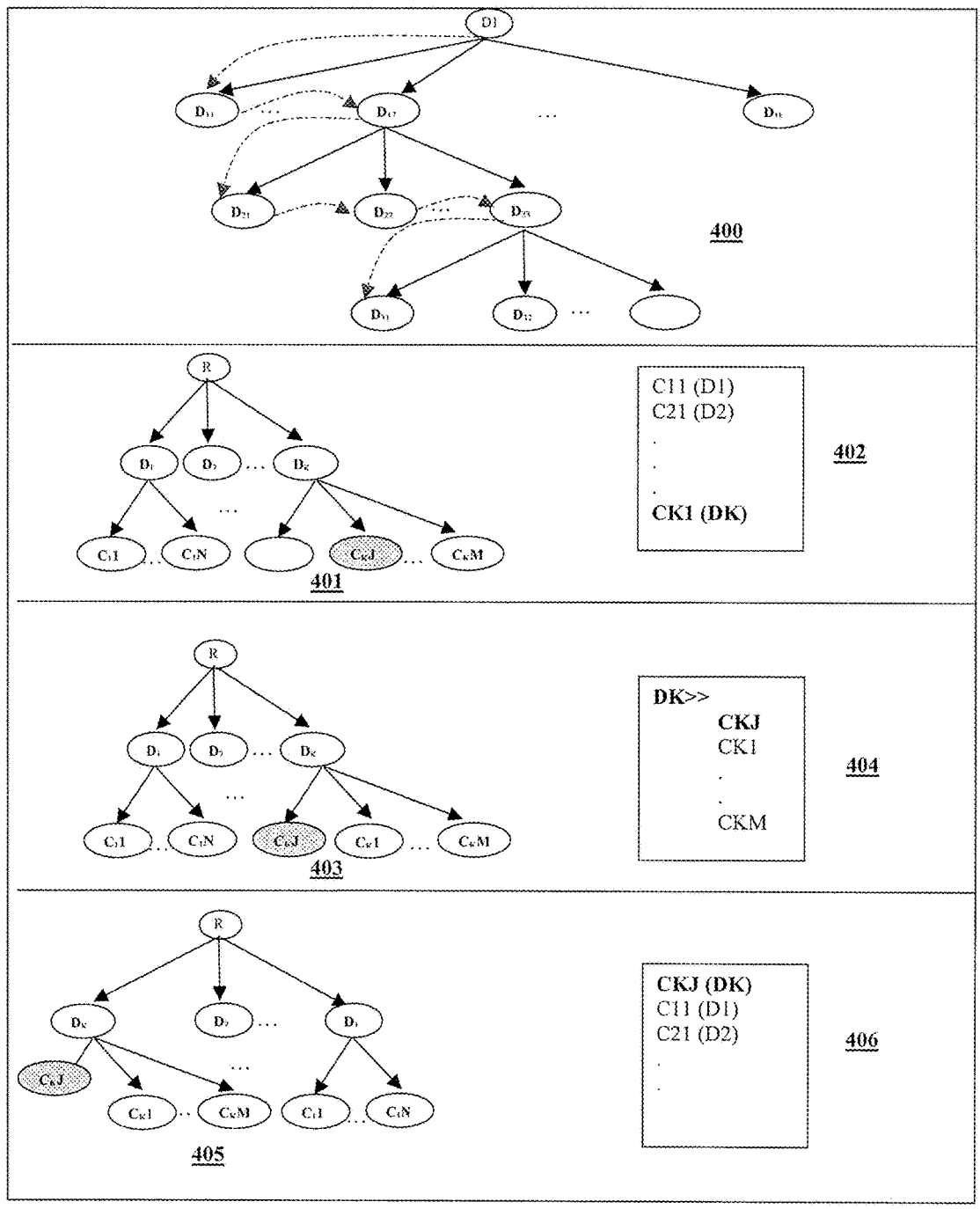
FIGS. 4A-4D illustrate a content hierarchy that automatically adjusts its structure (from the user's perspective) over time to match the user's preferences.

For illustrative purposes FIG. 4A shows a data hierarchy 400 represented as a tree—it could have been any other form of organization such as a graph. The initial condition of a search space, such as a phonebook, is shown as data nodes ($D_1$-$D_K$). Each data node is in turn a hierarchy of nodes of different depths. If a user were to navigate the tree purely as in a browse based fashion, then the number of steps (the cost of navigation) to reach a node at depth "i" in a pure browse based fashion is $\Sigma(L_{di}+N_i)$ ($1<=i<=I$) where L is the cost of linear traversal to a node at level "i" where the traversed node is an ancestor of the node of interest, and N is the cost of descending from an ancestor of the node to the first child in its immediate descendants list. This cost is primarily due to the linearization of the data hierarchy as the user descends down the tree by a pure browse action.

For example, a data hierarchy 401 is representative of a phonebook with data node $D_K$ representing John Doe, child node $C_kJ$ representing John Doe's mobile phone number, and the other child node siblings to child node $C_kJ$ representing John Doe's other contact information such as home and office numbers. The data hierarchy also contains node $D_1$ representing John Adams and node $D_2$ representing John Brown. The user interface could, from a rendering perspective, display both a contact (e.g. data nodes $D_1$ through $D_k$) and the associated primary contact number (e.g. child nodes $C_1 1$ through $C_k 1$). For example, when the user searches for "John" the result set 402 would contain $D_1$ (John Adams) and $C_1 i$ (John Adams' primary contact number), $D_2$ (John Brown) and $C_2 1$ (John Brown's primary contact number), up to and including $D_k$ (John Doe) and $C_k 1$ (John Doe's primary contact number). The user would have the option to either see other contact numbers for John Doe by descending down the tree, or directly making a call to the primary contact number initially presented.

If the user is interested in John Doe's mobile phone number, node $C_kJ$, the user may discover the number using a text search or browse based navigation. In addition, if the user repetitively searches for or browses to node $C_kJ$, the relevance weight assigned to this node would continue to strengthen with each repetitive action taken upon it. The increased relevance weight assigned to the node would be used to reorder the view of the navigation hierarchy from the user's perspective. As illustrated 401 prior to the learned preference and increased relevance weight, the node $C_kJ$ would be the $j^{th}$ entry presented in John Doe's list of contact numbers. As illustrated in 403, after the increased relevance weight is applied, node $C_kJ$ would bubble up to be the first entry within node $D_k$, e.g. becoming the first phone number in John Doe's contact folder. The result set 404 displayed for data node $D_k$ (John Doe) would now present John Doe's mobile phone number as the first entry in the result set.

As illustrated in 405, node $C_kJ$'s weight would continue to strengthen with usage and eventually this node would become the first discoverable node in the phonebook list. After learning has taken place the result set 406 would have $D_k$ (John Doe) and $C_kJ$ (John Doe's mobile number) as the first entry. The remainder of the result set, absent any other user selections, would contain $D_1$ (John Adams) and $C_1 1$ (John Adams' primary contact number), and $D_2$ (John Brown) and $C_2 1$ (John Brown's primary contact number).

Repetitive actions with regular patterns eventually result in the user not even having to do much. The relevant nodes receive an increased weight and the contact number would be rendered on the phone display at the appropriate time and location. It is important to note that this strengthening of the relevance weight of the node happens regardless of the type of navigation, either search or browse. Both result in the same form of reorganized view of the navigation hierarchy. For example, if the user always searches for John Doe and calls him, the increase in relevance weight of John Doe would result in John Doe being discovered with fewer characters. Finally, if the repetitive pattern is very regular, the text input step may even be eliminated. The first node in the phonebook context would contain John Doe's contact information and the user would just have to select the contact without entering any incremental text.

While the above illustration focuses on reordering for highly repetitive tasks, the system could also perform reordering of the user's view of the content space based on the broader knowledge of the user's tastes learned from the user's action patterns. For example, if the user always searches for action genre movies, then those movies could be given more relevance so as to be discovered more easily.

Figure 5:
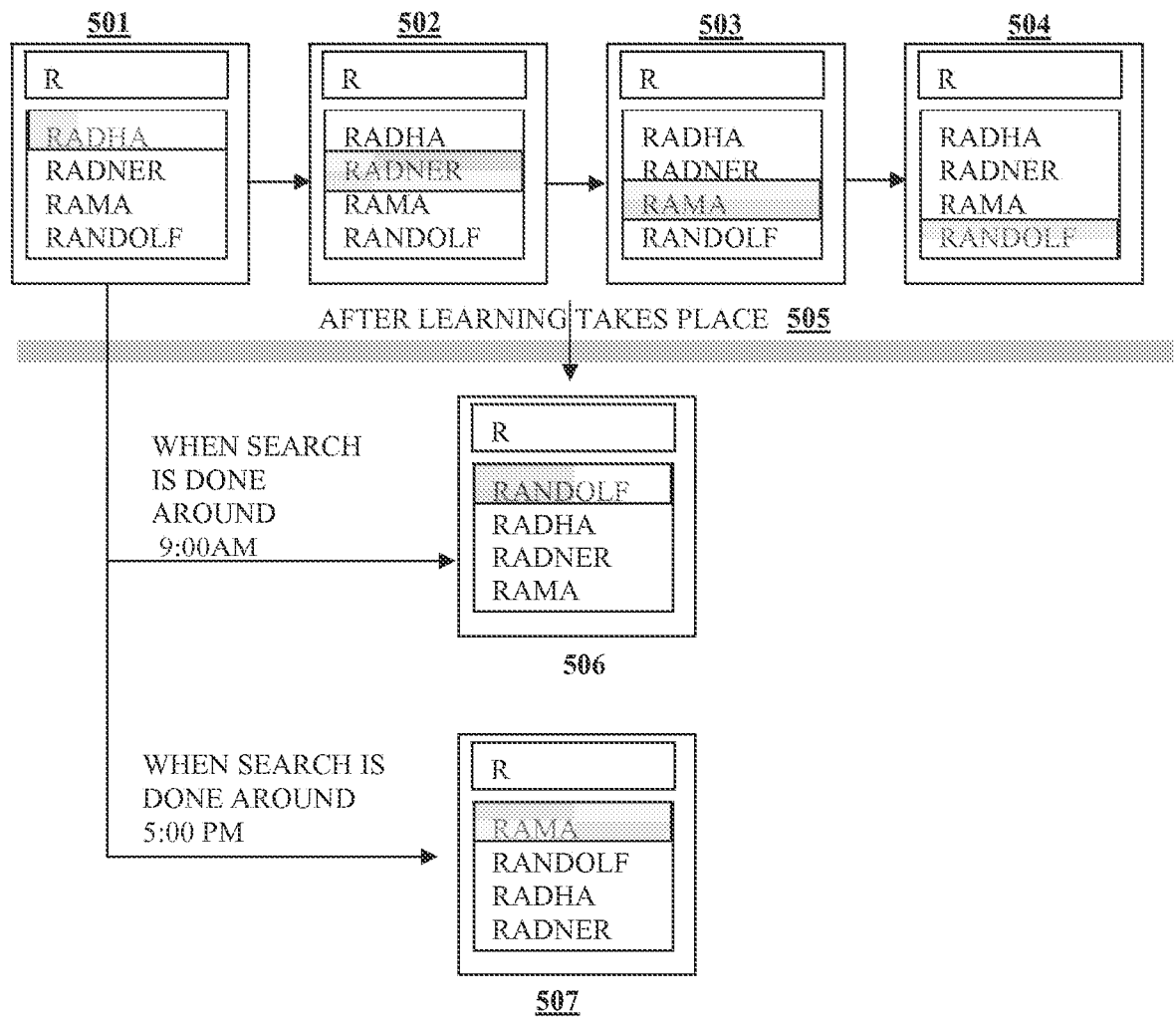
FIG. 5 illustrates the user's discovery of information using text search before and after system learns the user's action behavior.

FIG. 5 illustrates a user performing text input based incremental search on a mobile phone. The user types in 'R' (501), which results in the rendering of results starting with R. FIGS. 502-504 illustrate the user scrolling down to the last row to select RANDOLF to make a call. If this "search-call" action were a repetitive action (with time and location also considered), the system would learn this over time 505 and boost the relevance of RANDOLF so that the user can find this contact easily. Furthermore, if there is another person "RAMA" who is also called in a regular manner but in a different time window, then the entry of the same character "R" would bring up RANDOLF at 9:00 am (which is typically when a call is made to Randolf) and "Rama" at 5:00 pm (which is typically when a call is made to this person). Over time, this repetitive action would strengthen enough to even obviate the user to have to enter the character "R". Around 9:00 am in the morning, the phone would display "Randolf" on the top for easy access, and "Rama" around 5:00 pm. Thus, in this example, the presentment of the data hierarchy at 9:00 am is different from the presentment of the data hierarchy at 5:00 μm.

The time window identified for repetitive actions may be defined in advance or may be determined dynamically according to the frequency of the repetitive actions. For example, the time window may be set as 15-minute periods occurring during each day or the system may determine a larger window is appropriate for a particular day. The time window may also be differentiated by day of the week or date, e.g., different nodes may be of higher relevance during the week as compared to their relevance during the weekend. Finally, the system may interface with external applications and determine an ideal time window based on the data in the application. For example, the system may take data from a calendar application and boost the relevance of nodes based upon a weekly, monthly, or annual event (such as a birthday of a family member or a monthly project meeting).

Similarly, location of the user may influence the relevance of a node. For example, if the user is at work, the relevance of business contact information may be increased. Location may be determined by a variety of methods well known in the art, e.g., the user's device may have GPS capabilities.

Figure 6:
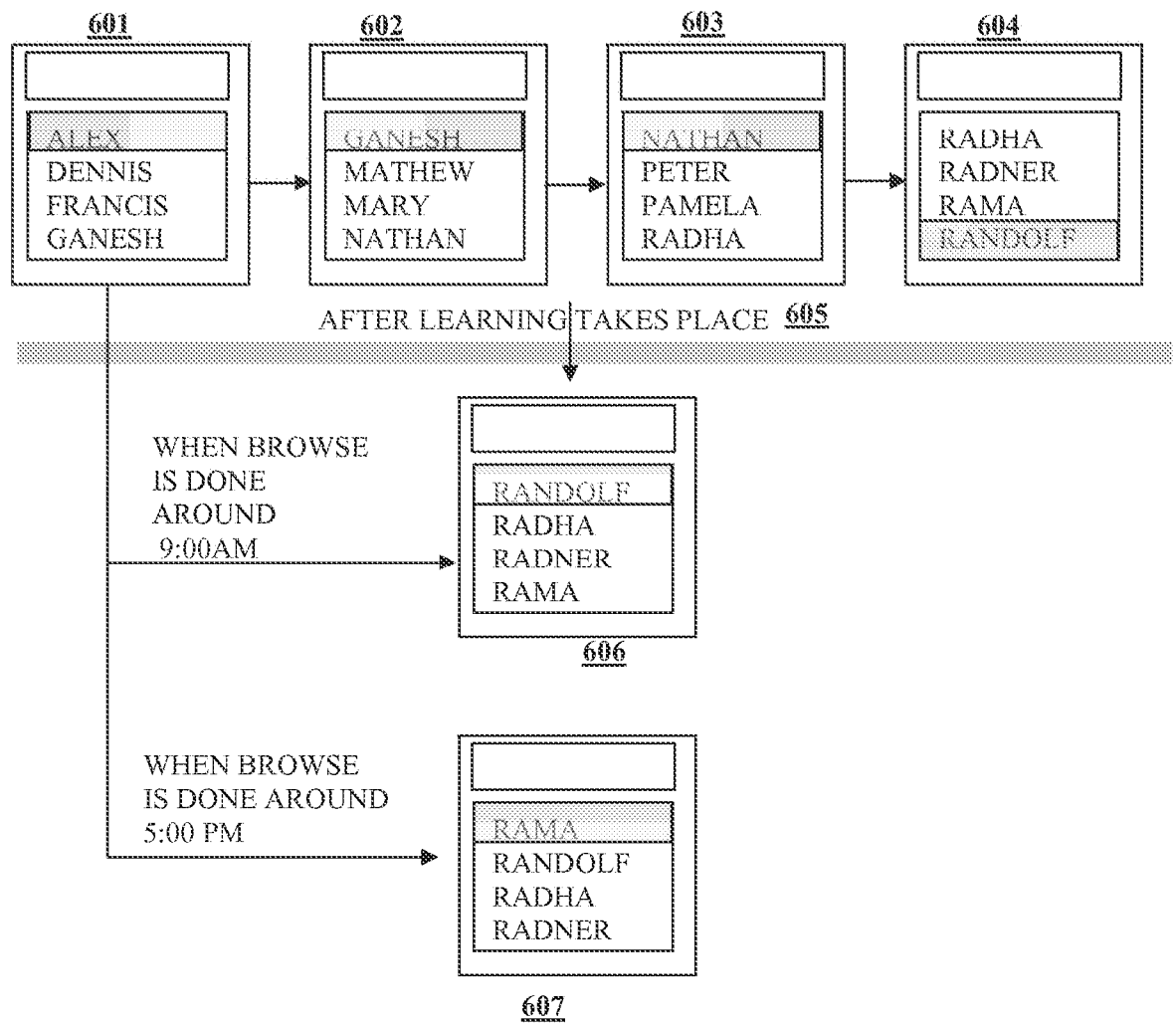
FIG. 6 illustrates the user's discovery of information using browse before and after system learns the user's action behavior

FIG. 6 illustrates the learning of a browse based repetitive navigation behavior. Steps 601 through 604 illustrate a user initially performing scroll (or page down operations) through a lexicographically sorted list of contacts to reach the desired contact, Randolf. The system learns this action behavior 605 over time, and automatically displays "Randolf s" number on the screen for easier access. Similarly, if the contact "Rama" were typically called at a different time window, then "Rama" would be displayed for easy access during that period of day. Thus from a lexicographic ordering (initial condition) the system learns the user's action patterns over time, to render orderings that reflect the most likely actions the user would perform for that particular time and location.

Figure 7:
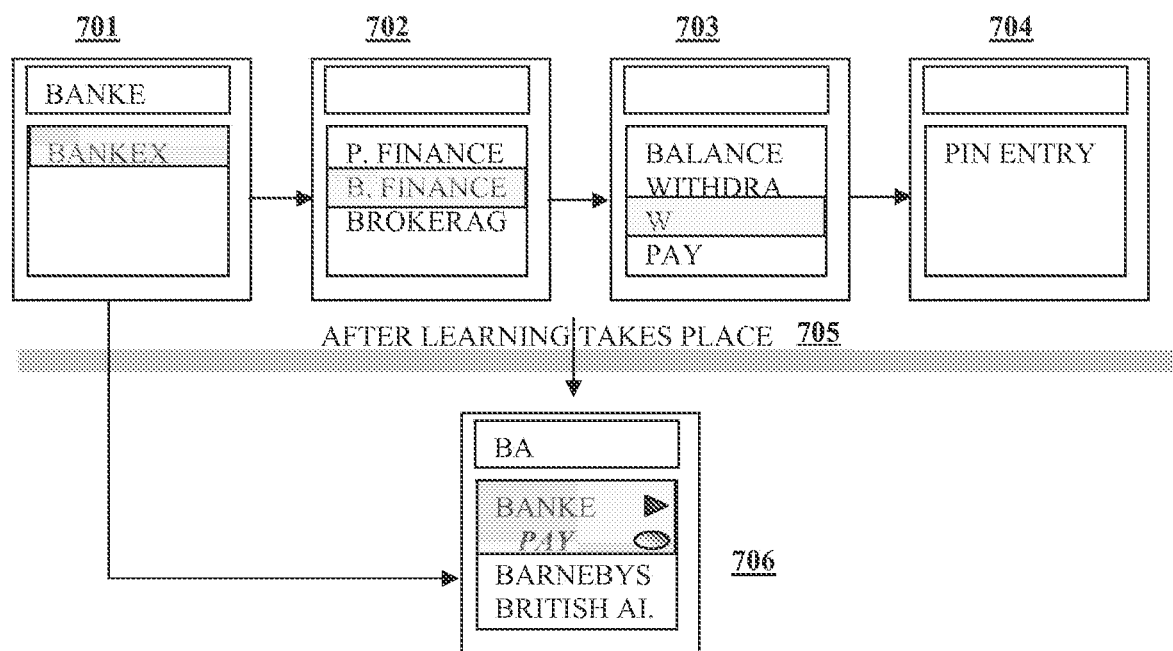
FIG. 7 illustrates the user performing a repetitive banking task before and after system learns the user's action behavior.

FIG. 7 illustrates another instance where a search and browse based navigation to reach an action is learned by the system and optimized to provide a better user experience. The user performs an incremental search 701, entering "BANKE" which results in discovering the bank of choice "BANKEX." The user then browses to the bank finance portion of the bank "B. FINANCE," 702 followed by selecting the payment item "PAY" from the submenu 703. The first step of making a payment is pin entry 704. As the system learns 705 the user's actions over time, the user's effort expended is reduced both in the number of characters used to get to the desired bank ("BA") and the number of browse actions the user needs to perform—the bill pay option is shown along with the bank in the result. The user now has to enter three fewer characters during the incremental text search, and does not need to browse through two submenus to select the payment item. This form of rendering an aggregate node, along with the most likely child node that user may act upon, gives the user the choice to act on both items without further effort. The user can select the pay bill option or choose to browse all the other choices.

Figure 8:
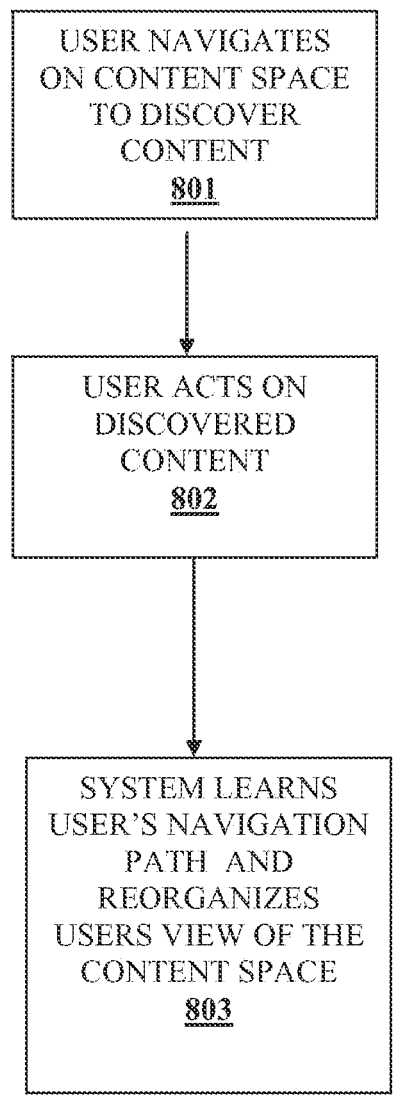
FIG. 8 summarizes the basic concept of personalized navigation.

FIG. 8 summarizes the basic concept of personalizing the content space of the user based on learned behavior. The user's navigation through the content space 801 and actions on discovered content 802 is learned by the system. Each time a user performs an action on a node, the relevance of that node (for that particular time and location), with respect to the user is altered. The view of the content hierarchy from the user's perspective is altered to match the user's learned behavior and preferences.

Figure 9:
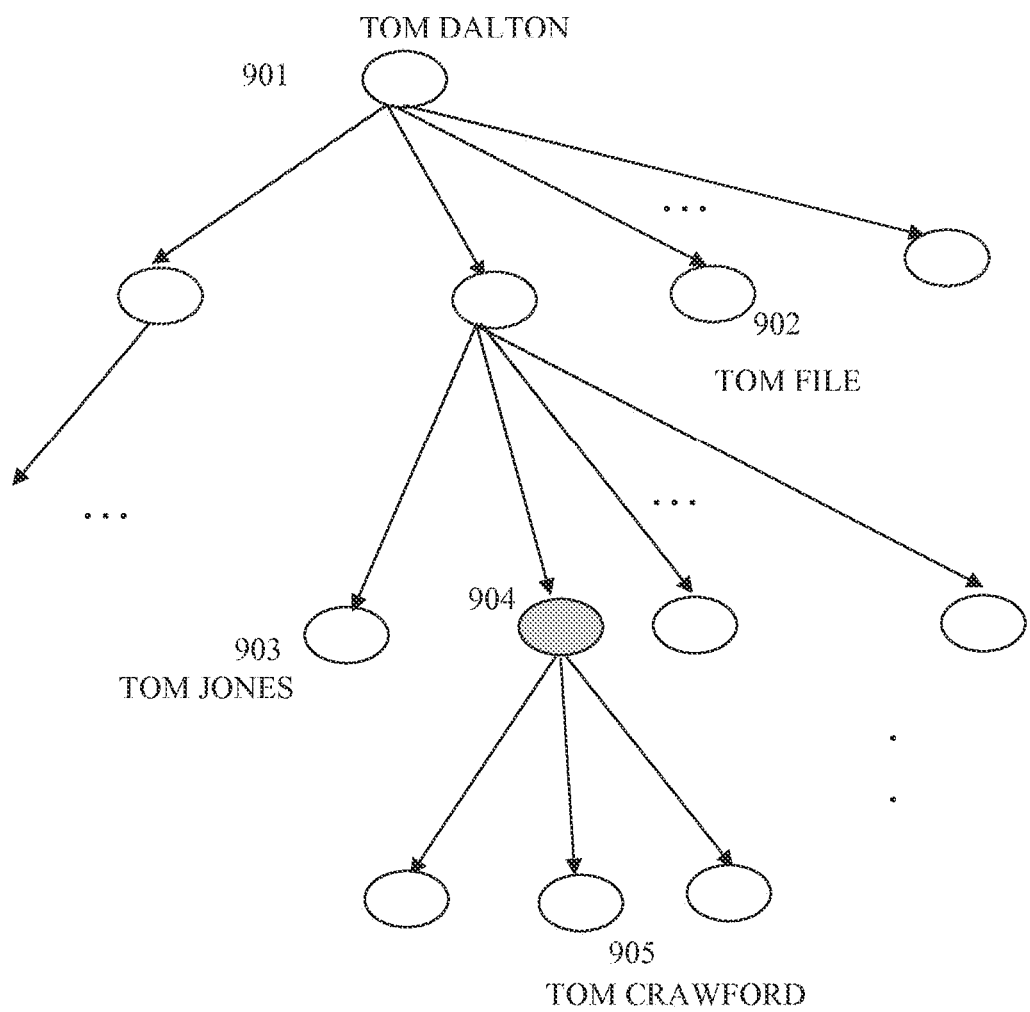
FIG. 9 illustrates a corporate hierarchy that is being navigated by the user.

Personalized Navigation Based on the User's Relationship to the Information Hierarchy FIG. 9 illustrates an instance of a corporate employee hierarchy tree with a user 904 at a particular level in this hierarchy, specifically level 2. Tom Dalton 901 is at level 0, Tom Clancy 902 is at level 1, Tom Jones 903 is a peer of the user 904 at level 2, and Tom Crawford 905 is a direct report of the user 904 on level 3. In the initial conditions state, a user who just joins a company or moves to a new position within a company, can benefit from the present invention, which adjusts the organization tree to help the user 904 easily find the members of the group at his level, his direct reports, or his manager. The user can easily find the person he is looking for by entering just a few characters of an incremental search or with minimal steps using a pure browse search.

When the user 904 searches for a particular person by entering text, e.g., "TOM", the system automatically lists the results in descending order of the proximity of the matched employee(s) in relationship to the user's position in the hierarchy. However, after learning, the nodes that are immediate descendents to the user's node may trump the user's sibling nodes, since the immediate descendents may be direct reports. Additionally, if the user 904 is discovering the information using an incremental search, e.g., "TO", results may be shown with matches from different nodes as clusters for each level with one match displayed with the aggregate node (e.g. TOM CLANCY at Level 1, TOM CRAWFORD Level 3, TOM DALTON level 0). The system may provide a means to navigate these aggregate nodes, so the user can quickly get to any level. If the user is navigating the tree purely by a browse means, then the employees at the user's level (or his immediate reports) will be listed first as aggregates followed by other levels. This form of navigation would be more user-friendly than a pure lexicographically ordered browse tree.

The user search experience is also improved, in comparison to pure organization based clustering, by reordering the information hierarchy to match the user's repetitive action behavior. For example, if the user 904 repetitively navigates to a sibling node to perform an action (e.g. navigating to the node for Tom Jones 903 to place a phone call), then the ordering of the user's siblings would be adjusted over time to reduce this navigation distance by bringing that node closer to the user. This approach can also be used for any node that is at any level. For example, if the user 904 always navigates to the node for Tom Clancy 902 to place a phone call, then that node is reordered at its own level to come up quicker. Additionally with time, the nodes that are frequently visited in the hierarchy would move closer to the user's home node 904.

The navigation process within the corporate employee hierarchy tree could have been text-based search or browse based navigation. Over time the nodes that are frequently visited in the hierarchy would move closer to the user's home node within the hierarchy, thus easing their discovery either by search or browse. If the search were an incremental search, over time personalization would reduce the number of characters required for discovering the node. If the search was a browsed based navigation, over time personalization would reduce the number of user selections required for discovering the node.

Figure 10:
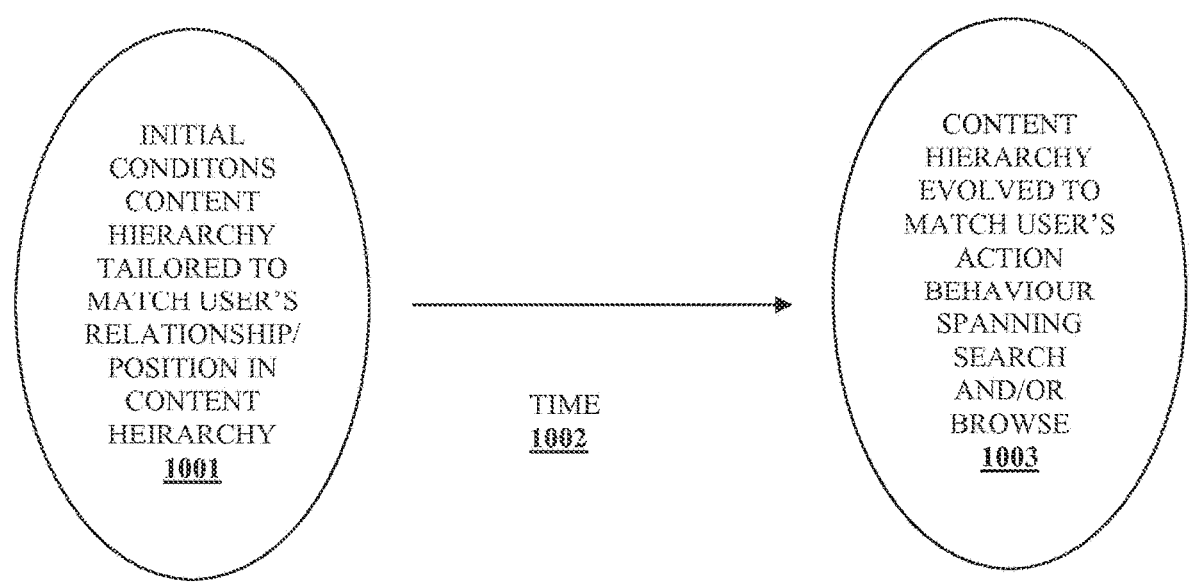
FIG. 10 illustrates the initial conditions and the personalized navigation as the system continues to learn the user's action behavior.

FIG. 10 illustrates the evolution of the navigation system with time 1002 as the navigation hierarchy is reordered to match the user's action behavior (e.g. making a phone call after discovering a node of interest). In an embodiment of the invention, the initial conditions 1001 would start with the "locus of relevance centered" at the user's position in the organization hierarchy. As the user navigates hierarch and selects specific content items, the hierarchy would evolve to bring referenced nodes closer to user's locus of relevance. For example, using the method described in FIGS. 4A-4D above, this could be accomplished by assigning initial relevance weights to nodes in the navigation hierarchy based on the users position within a corporate hierarchy. The initial relevance weights could be assigned such that, prior to learning, the results would be ordered to return peers, then subordinates, then supervisors, and finally persons unrelated to the user in the corporate hierarchy. As the user navigates and selects content items from the navigation hierarchy the relevance weights of particular nodes, with respect to the particular user performing the search, would be increased. When the user makes subsequent searches, the nodes with higher relevance weights would be presented higher in the search results.

In another embodiment of the invention the locus of relevance would always remain at the root of the organization hierarchy, with the user's nodes of interest hoisted to the root for easy access. This method of reordering would be meaningful for information finding in an entertainment space, where no prior knowledge of the user's interest is known, and hence there is no a priori relationship between the user and the content navigation hierarchy.

Another instance of automatic adjustment of circle of relevance is where the user is part of a defined group, for example, where the user is a member of an Instant Messaging group or an online community group, such as a Yahoo group. The system would automatically increase the relevance weights of the members of the group in relation to the user. Here the adjustment of the circle of relevance is done by the system merely by the participation of the user in these groups and no explicit action by the user is required. This is similar to the corporate setting where a user can be grouped with his or her peers, or where a user can be grouped with all other employees with offices on the same floor in a building.

Additionally, the system can take advantage of dynamic groups created for projects spanning employees in the corporate hierarchy. The members of these dynamically created groups would also move closer to the "locus of relevance" of the user. These groups could have been created explicitly in the corporate database, or the system may interface with external applications, such as a mailing list in an email application, in order to discover these dynamic groups. Once a dynamically created group is detected, again using the techniques described above, the relevance weights of the members of that group can be adjusted such that group members are returned higher in the result set, overriding the default corporate hierarchy. For example, after a new emailing list for a project is created, the relevance weights of the members of that project can be adjusted and the results would be ordered to return project members, then peers, then subordinates, then supervisors, and finally persons unrelated to the user in the corporate hierarchy.

Automatic adjustment of locus or circle of relevance would also be applied in a transitive manner between individuals or groups of individuals based on the actions of the individuals. For example, in a community, if a Susie calls Barbara often, and Barbara calls Kate often, then the likelihood of Susie calling Kate increases over time. Hence, when Susie makes a search or performs a browse, the relevance of ordering of Kate is increased, such that Susie can discover Kate more easily. In this case, when Susie navigates and selects the contact information for Barbara, the relevance weight for that node is adjusted. In addition, the relevance weights for any nodes that Barbara has selected, e.g. Kate, are also increased with respect to Susie. The contact information for both Barbara and Kate will now be returned higher in the result set for any subsequent searches by Susie.

In an embodiment of the invention the locus of relevance would also be adjusted over time by the system taking into account the actions taken by groups of individuals. For example, if members of two groups in an organization hierarchy communicate often with each other (e.g. the action taken by users in this case being making a phone call), then the two groups would come closer to each other in the navigation hierarchy. So when searches are done by a member of one of these groups, the system would give a higher relevance to people from the other group with which the communication was high—this would facilitate the discovery of the desired result with fewer characters in the case of incremental search. Similarly, in a browse based discovery, the other group would be found closer to the user's own group in the organization hierarchy.

For example, consider a corporate hierarchy where Able and Baker are members of the accounting department, Charlie and Dawn are members of the tax department, and Eugene is a member of the legal department. If Able calls Charlie on a regular basis then the accounting and tax departments become closer to each other in the navigation hierarchy. Here the relevance weights for all members of both departments are adjusted, not just those for Able and Charlie. So when Baker searches the corporate hierarchy members of the tax department will have a higher relevance than members of the legal department. This is due to the contacts, over time, between members of the two departments, e.g. the contacts between Able and Charlie, and the associated adjustments to the relevance weights for all members of both departments.

Having described preferred embodiments of the present invention, it should be apparent that modifications can be made without departing from the spirit and scope of the invention. For example, the relative weighting of nodes has been used herein in the context of a phone book. However, embodiments of the invention can be implemented for any form of node based content space, such as genres of movies.

What is claimed is:

1. A method, comprising:
providing access to a plurality of content items;
accessing a relevance score for each content item of a subset of the plurality of content items, wherein the relevance score indicates relevance of a content item to a user;
identifying a group of users connected with the user, based on interactions between users;
adjusting the relevance score of each content item of the subset of the plurality of content items based at least on detected interactions between the user and members of the group of users;
ordering the identified content items based at least in part on the relevance score of each identified content item; and
generating for display the ordered content items on a user interface browsable by the user.

2. A system, comprising:
input/output circuitry; and
control circuitry configured to:
provide access to a plurality of content items;
accessing a relevance score for each content item of a subset of the plurality of content items, wherein the relevance score indicates relevance of a content item to a user;
identifying a group of users connected with the user, based on interactions between users;
adjust the relevance score of each content item of the subset of the plurality of content items based at least on detected interactions between the user and members of the group of users;
order the identified content items based at least in part on the relevance score of each identified content item; and
generate for display the ordered content items on a user interface browsable by the user.

3. The method of claim 1 wherein the adjusting is based at least in part on actions taken by members of the group of users.

4. The method of claim 1, wherein adjusting the relevance score is based on user communications with at least one member of the group of users.

5. The method of claim 1, further comprising:
receiving a search query input from the user; and
in response to receiving the search query input, selecting and presenting to the user a second subset of the subset of content items, wherein the second subset is also ordered based at least in part of the relevance score of each identified content item.

6. The method of claim 1, wherein adjusting the relevance score of each content item further comprises:
adjusting the relevance score of each content item of the subset based on the number of members of the group that have interacted with the respective content item.

7. The method of claim 1, further comprising:
detecting a user interaction of the user with a content item; and
in response to detecting the interaction:
adjusting the relevance score of the content item.

8. The method of claim 1, further comprising:
detecting a user interaction of the user with a content item; and
in response to detecting the interaction adjusting relevance score of another content item associated with the first content item.

9. The method of claim 1, further comprising decaying the adjusted relevance scores
as time passes from the act of adjusting the relevance weights.

10. The method of claim 1, further comprising further modifying the adjusted relevance
scores based on the number of user interactions occurring after the act of adjusting the
relevance weights.

11. The method of claim 1, wherein the modifying the adjusted relevance scores based
on the number of user interactions occurring after the act of adjusting the relevance weights
comprises decaying the adjusted relevance scores.

12. The method of claim 1, further comprising:
receiving a selection of a content item;
determining a context in which the user performs the selection of the content item, the context including at least one of geographic location of the user, day, date, and time; and
associating the context with the adjusted relevance score of the selected content item.

13. The system of claim 2, wherein the control circuitry configured to adjust the
relevance score of each content item based at least in part on actions taken by members of
the group of users.

14. The system of claim 2, wherein the control circuitry configured to adjust the
relevance score based on user communications with at least one member of the group of
users.

15. The system of claim 2, wherein the control circuitry is further configured to:
receive a search query input from the user; and
in response to receiving the search query input, select and present to the user a second subset of the subset of content items, wherein the second subset is also ordered based at least in part of the relevance score of each identified content item.

16. The system of claim 2 wherein the control circuitry configured to adjust the
relevance score of each content item is further configured to:
adjust the relevance score of each content item of the subset based on the number of members of the group that have interacted with the respective content item.

17. The system of claim 2, wherein the control circuitry is further configured to:
detect a user an interaction of the user with a content item; and
in response to detecting the interaction:
adjust the relevance score of the content item.

18. The system of claim 2, wherein the control circuitry is further configured to:
detect a user interaction of the user with a content item; and
in response to detecting the interaction adjusting relevance score of another content item associated with the first content item.

19. The system of claim 2, wherein the control circuitry is further configured to further
modify the adjusted relevance scores based on the number of user interactions occurring
after the act of adjusting the relevance weights.

20. The system of claim 2, wherein the control circuitry is further configured to decay
the adjusted relevance scores based on the number of user selections occurring after the act
of adjusting the relevance weights.

21. The system of claim 2 wherein the control circuitry is further configured to:
receive a selection of a content item;
determine a context in which the user performs the selection of the content item, the context including at least one of geographic location of the user, day, date, and time; and
associate the context with the adjusted relevance score of the selected content item.

22. The method of claim 5, wherein the second subset is browsable by the user.

23. The method of claim 7, further comprising
in response to detecting the user interaction with the content item, adjusting relevance score of another content item associated with the first content item.

24. The method of claim 12, further comprising:
receiving a subsequent input entered by the user for identifying desired content items; and
in response to receiving the subsequent input, selecting and presenting to the user a subsequent subset of content items, wherein only the adjusted relevance scores associated with the context in which the user enters the subsequent input are used in the selecting and presenting of the subsequent subset of content items.

25. The system of claim 15, wherein the second subset is browsable by the user.

26. The system of claim 17, wherein the control circuitry is further configured to:
in response to detecting the user interaction with the content item, adjust relevance score of another content item associated with the first content item.

27. The method of claim 19, wherein the control circuitry is further configured to further
modify the adjusted relevance scores by decaying the adjusted relevance scores.

28. The system of claim 21, wherein the control circuitry is further configured to:
receive a subsequent input entered by the user for identifying desired content items; and
in response to receiving the subsequent input, select and present to the user a subsequent subset of content items, wherein only the adjusted relevance scores associated with the context in which the user enters the subsequent input are used in the selecting and presenting of the subsequent subset of content items.

* * * * *